UNITED STATES PATENT OFFICE

HEINRICH HIRTZ, OF EILENBURG, GERMANY

PROCESS OF RECOVERING NITRIC ACID FROM WEAK NITRIC LIQUORS

No Drawing. Application filed February 23, 1924, Serial No. 694,710, and in Germany June 15, 1923.

This invention has reference to a process of recovering nitric acid from waste and other liquors containing small amounts thereof in great dilution, and among its various uses it is particularly applicable to the recovery of nitric acid from the weak waste or spent liquors of the various industries in which nitric acid or nitrates are used. As heretofore practised, it was practically impossible on an industrial scale to recover the nitration acid used in the manufacture of nitro-cellulose and remaining in the nitrated charge, so that this acid had to go to waste entirely with the waste liquors.

Attempts have been made to obviate this inconvenience which seriously interfered with the economy of the plant by causing the wash waters to become enriched in acid by using them repeatedly, such wash waters being then treated with ferrous sulphate and sulphuric acid in order to convert the nitric acid into nitric oxides, which were then oxidized to nitric acid. This previous process, however, did not prove satisfactory, as its use in the factory presented various difficulties in practical operation, particularly because the ferric sulphate produced by the employment of sulphate of iron and sulphuric acid had to be reduced to ferrous sulphate by a suitable reducing agent, such as iron. Then, in the process referred to the very large amounts of liquid which have to be dealt with must be treated once more with metallic iron, after being freed from the nitric acid, in order to recover the iron sulphate which is then obtained in its turn in a highly diluted condition. Thus, the quantities of liquid will increase in a short time to such an extent as to render impossible or impractical the employment of the prior process referred to in view of the reasons stated and from other causes.

In accordance with my invention it has been ascertained that pyrites possess the property of reacting with weak nitric acid both in the presence of as well as without sulphuric acid in such a manner that the nitric acid is reduced quantitatively to nitric oxide, NO. Inasmuch as pyrites may be regarded as a hyper-sulfid, that is to say, as a rather loose combination of sulphur with FeS (mono-sulfide), and inasmuch as the nitric acid employed is very dilute the molecule of the pyrite is split in the well known manner into FeS and sulphur of which the monosulfid, (as the nitric acid is simultaneously reduced by the action of the sulphur), can only be slightly oxidized to iron vitriol or ferrous-sulphate according to the well-known Lancashire-process of obtaining iron vitriol from pyrite by decomposition in the open air in the presence of water. The sulphur is oxidized to sulphuric acid. Inasmuch as the formation and evolution of gaseous NO by the combined action of sulphuric acid and ferrous-sulphate upon nitric acid, even in the dilute state is well-known and is used in analytical methods, the nitric oxide formed will be prevented from forming ferric-nitrate, but on but slight heating the nitric oxide, which in the cold is known to dissolve in ferrous sulphate solution without formation of nitrate, is liberated and may be recovered by any suitable means. Thus in the practical operation of my invention the waste liquors after slightly heating them are brought into contact in suitable apparatus with an excess of comminuted pyrites until the entire nitric acid has been removed therefrom.

The process operates absolutely automatically. It is only necessary from time to time to charge the first chamber with fresh pyrite after removal of the spent pyrite residue, and to then connect such chamber, so as to form the end of the series. The evolved nitric oxide is conducted into towers where it is mixed with the necessary amount of air, and is condensed to nitric acid of 50 per cent or more by a suitable washing liquid such as water with a small quantity of nitrous vitriol (nitrous sulphuric acid) which acts as a carrier of oxygen, or even ordinary water will suffice, if sufficient provision is made to promote the access of air, or it is absorbed in dilute sulphuric acid or in waste acid.

It is one of the important features of the process of this invention that only comparatively little pyrite is required, inasmuch as one molecule of pyrite is capable of absorbing seven and one-half atoms of oxygen, so that five molecules of nitric acid can be reduced to NO with one molecule of pyrite.

$$2FeS_2 + 7O_2 = 2FeO + 4SO_3 = 2FeSO_4 + 2SO_3$$
$$4FeS_2 + 15O_2 = 2Fe_2O_3 + 8SO_3 = 2Fe_2(SO_4)_3 + 2SO_3$$

or in the presence of water:—

$$2FeS_2 + 7O_2 + 2H_2O = 2FeSO_4 + 2H_2SO_4$$
$$4FeS_2 + 15O_2 + 2H_2O = 2Fe_2(SO_4)_3 + 2H_2SO_4$$

and in the presence of dilute nitric acid:—

$$3FeS_2 + 14HNO_3 = 3FeSO_4 + 3H_2SO_4 + 4H_2O + 14NO$$
$$2FeS_2 + 10HNO_3 = Fe_2(SO_4)_3 + H_2SO_4 + 4H_2O + 10NO$$

Inasmuch as the gaseous nitric oxid formed is only loosely contained in the solution of sulphuric acid and ferrous sulphate, it is readily given off at a concentration of practically 100% on slightly heating the liquid, and even at ordinary temperature. The higher oxides of NO produced by the oxidation of NO are readily absorbed in water, and yield a nitric acid of 50% strength or more. Hence, with 24 parts of pyrite the same effect is theoretically produced as with 84 parts of iron. Furthermore, it is of advantage that there is no necessity of enriching the wash waters containing nitric acid; the washers, on the contrary, may be treated according to the process directly as obtained. Then, the liquors from which the nitric acid has been removed do not necessitate any further treatment; they may be allowed to go to waste, as they are worthless. It has been ascertained by actual analysis that the concentration of the nitric acid or of nitrates in the waste liquor amounts to from 0.0 to 0.1% at the maximum.

For the carrying out of the process of this invention one may even use refuse and low grade pyrites which are of no value at all for the manufacture of sulphuric acid.

Nitric oxide, NO, being only soluble in comparatively strong nitric acid or sulphuric acid, there is no liability of any substantial quantities thereof being retained in the dilute acid liquor and going to waste.

The invention has been hereinbefore described in its broad aspects only, and it should be understood that it is capable of changes and modifications to better adapt the invention to varying conditions, and within the meaning of the claims hereunto appended. It should also be understood that sulphide ores producing an action similar to pyrites may be used.

I claim:—

1. The process of recovering nitric acid from weak nitric acid liquors, which consists in treating such liquors with pyrites, thereby converting the nitric acid into nitric oxide and recovering the nitric acid by converting the nitric oxide to nitric acid.

2. The process of recoverng nitric acid from weak nitric acid liquors containing sulphuric acid which process consists in treating such liquids with pyrite, reducing the nitric acid to lower oxides of nitrogen and re-converting said oxides to nitric acid.

3. The process of recovering nitric acid from dilute nitric acid-containing liquors, which consists in heating and treating said liquors with an excess of pyrites, oxidizing the gaseous low oxides of nitrogen and absorbing the oxides formed in water.

4. The process of recovering nitric acid from weak nitric liquors which consists in treating said liquors with an excess of pyrite in the presence of sulphuric acid, thereby generating and liberating gaseous nitric oxide, and oxidizing and condensing the nitric oxide in the presence of water.

5. The process of recovering nitric acid from weak nitric liquors, which consists in heating and treating said liquors with an excess of pyrite in the presence of sulphuric acid, and oxidizing and condensing the gaseous nitric oxide formed in the presence of water.

HEINR. HIRTZ.